No. 870,147. PATENTED NOV. 5, 1907.
R. WIKANDER.
MULTIPLE UNIT CONTROLLING SYSTEM FOR ELECTRIC LOCOMOTIVES
OR MOTOR CARS.
APPLICATION FILED JAN. 5, 1907.

Witnesses
J.J. Sheehy Jr.
N. C. Healy

Inventor
Ragnar Wikander.
By James J. Shurly
Attorney.

No. 870,147. PATENTED NOV. 5, 1907.
R. WIKANDER.
MULTIPLE UNIT CONTROLLING SYSTEM FOR ELECTRIC LOCOMOTIVES
OR MOTOR CARS.
APPLICATION FILED JAN. 5, 1907.

Witnesses.
J. J. Sheehy Jr.
N. C. Healy

Inventor.
Ragnar Wikander.
By James J. Sheehy
Attorney

UNITED STATES PATENT OFFICE.

RAGNAR WIKANDER, OF WESTERÅS, SWEDEN.

MULTIPLE-UNIT-CONTROLLING SYSTEM FOR ELECTRIC LOCOMOTIVES OR MOTOR-CARS.

No. 870,147.     Specification of Letters Patent.     Patented Nov. 5, 1907.

Application filed January 5, 1907. Serial No. 351,006.

*To all whom it may concern:*

Be it known that I, RAGNAR WIKANDER, a citizen of the Kingdom of Sweden, residing at Westerås, Sweden, have invented new and useful Improvements in Multiple-Unit-Controlling Systems for Electric Locomotives or Motor-Cars, of which the following is a specification.

This invention relates to improvements in multiple-unit-controlling systems for electric locomotives or motor-cars.

For controlling the speed of trains having two or more electric locomotives or motor-cars a system of controlling circuits besides the motor-circuits has been used for the operation of circuit-breakers, drum-regulators, or the like, which accomplish the connections of the motor-circuits required for starting and regulating the speed. The said controlling-circuits may be led through several electric locomotives or motor-cars coupled to each other and may be controlled from each of the latter, so that the same connections are simultaneously accomplished in all the said locomotives or motor-cars. For each controlling-circuit one wire is provided, the said wires being led through all the locomotives and each supplying current to one circuit-breaker on each locomotive. For forward and backward movement wires are used and further one or more wires are provided for each speed. A controlling-device of said kind is known as multiple-unit-controlling-system. If two or more locomotives, for which the said controlling system is used, be coupled together and the successive adjustments of the controlling members do not give the same speeds at the same load the result will be that the resulting speed generally obtains an average value overloading that or those locomotives which are constructed for a greater speed, while the locomotive or locomotives constructed for a lower speed will not be sufficiently loaded.

The object of the present invention is to remove the said disadvantage and it consists principally in the combination with a multiple-unit-controlling-system of means for regulating independently the voltages supplied to the motors of each unit, as will be more particularly set forth herebelow.

The invention may be carried into practice in different manners depending on the kind of electric current used, the connection of the motors, the manner of supplying the same with current, and so on.

In the accompanying drawings forming a part of this specification I have shown some forms of the invention, where the driving-motors of the electric locomotives are supplied with alternating current of high voltage through auto-transformers.

Figure 1:
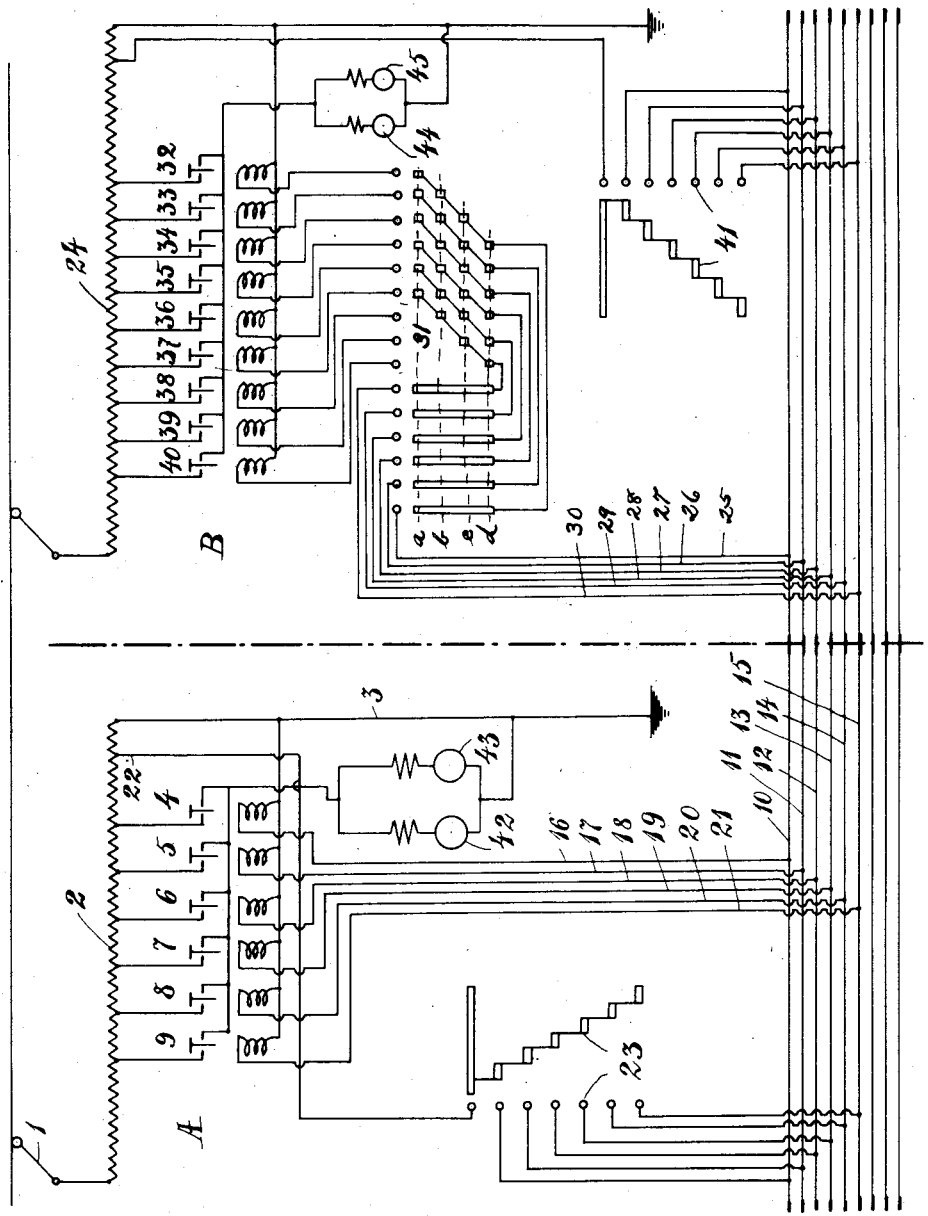
Figure 1 illustrates diagrammatically the connection of one electric locomotive to another locomotive provided with devices according to the present invention for suiting the speed of the latter to that of the former.

Referring to Fig. 1, A is an electric locomotive provided with a current-collector 1 which is connected to the one pole of an auto-transformer 2, the other pole of which is connected to the earth by means of a wire 3. The said transformer is provided with spaced leads connected to electro-magnetically operated circuit-breakers 4, 5, 6, 7, 8 and 9, to which current is supplied by means of the controlling-wires 10, 11, 12, 13, 14 and 15 running through the train, and corresponding branch-wires 16, 17, 18, 19, 20, and 21. The controlling circuit is taken out through an extra connection 22 of the transformer and is supplied to the several controlling-wires through the motor-man's switch 23, it being supposed that the train is controlled from the locomotive A. B represents the other locomotive connected to the locomotive A and controlled therefrom, the locomotive B being provided with devices embodying the present invention, whereby the control of its speed may be varied within wide limits so as to suit to the control of speed of the locomotive A or of other locomotives to which it eventually will be connected. For such purpose the auto-transformer 24 has a greater number of spaced leads than that used for the normal control of speed from starting to full speed. The controlling wires 25, 26, 27, 28, 29, and 30 are connected to a switching device 31 by means of which they may be connected to any desired set of the electro-magnetically operated circuit-breakers inserted in the said spaced leads so as to obtain the desired control of speed. In the form shown nine circuit-breakers 32, 33, 34, 35, 36, 37, 38, 39, and 40 are provided, and the switching-device 31 has four operation-positions *a*, *b*, *c*, and *d*, see Fig. 1, whereby four different controls of speed may be obtained. In the active position *a*, the motor control is attained by means of the switches or circuit breakers 32 to 37, inclusive, while the switches 38, 39 and 40 are disconnected, with the result that the motors are supplied with the highest voltages to assure their running at the greatest speeds. In the active position *b*, the motor control is obtained by means of the switches 33 to 38, inclusive; the switches 32, and 39, 40 being disconnected. In consequence of this, the voltages supplied to the motors 44, 45 will be less than in the position *a* and accordingly the speed will be lower. In the active position *c*, the motor control is obtained by means of the switches 34 to 39, in-clusive; the switches 32, 33 and 40 being disconnected. Because of this the voltages supplied to the motors and the speeds are further reduced. In the position *d*, the motor control is obtained by means of the switches 35 to 40, inclusive; the switches 32, 33 and 34 being disconnected. This position gives the lowest voltages which can be obtained from the transformer 24 and accordingly the lowest speeds of the motors 44, 45. The locomotive B has a motor-man's switch 41 which is used only when the train is controlled from the locomotive B.

The motors of both locomotives are shown as series-motors 42, 43 and 44, 45 connected in parallel.

When the locomotives are coupled together, the switching-device 31 is placed in such a position, for instance the position a, which best affords the control of speed of the locomotive A, i. e. assures that the motors of both locomotives at approximately the same speed will be loaded with normal current and will consequently work in an economical manner. Supposing further that the motors, have approximately similar curves of speed, eventual overloads will distribute themselves almost proportionally to the power of the motors.

When the motor-man's switch 23 is placed into its first operation-position, a controlling current will be supplied from the lead 22 through the controlling-wire 10 and therefrom through the branch-wires 16 and 25 to the circuit-breakers 4 and 32 on the locomotives A and B respectively, whereby a starting current will be supplied to the two groups of motors. When the motor-man's switch is thereupon successively brought into the other positions the circuit-breakers 5—9 and 33—37 respectively will be successively operated for supplying an increasing voltage to the motors, until full speed has been reached.

Figure 2:
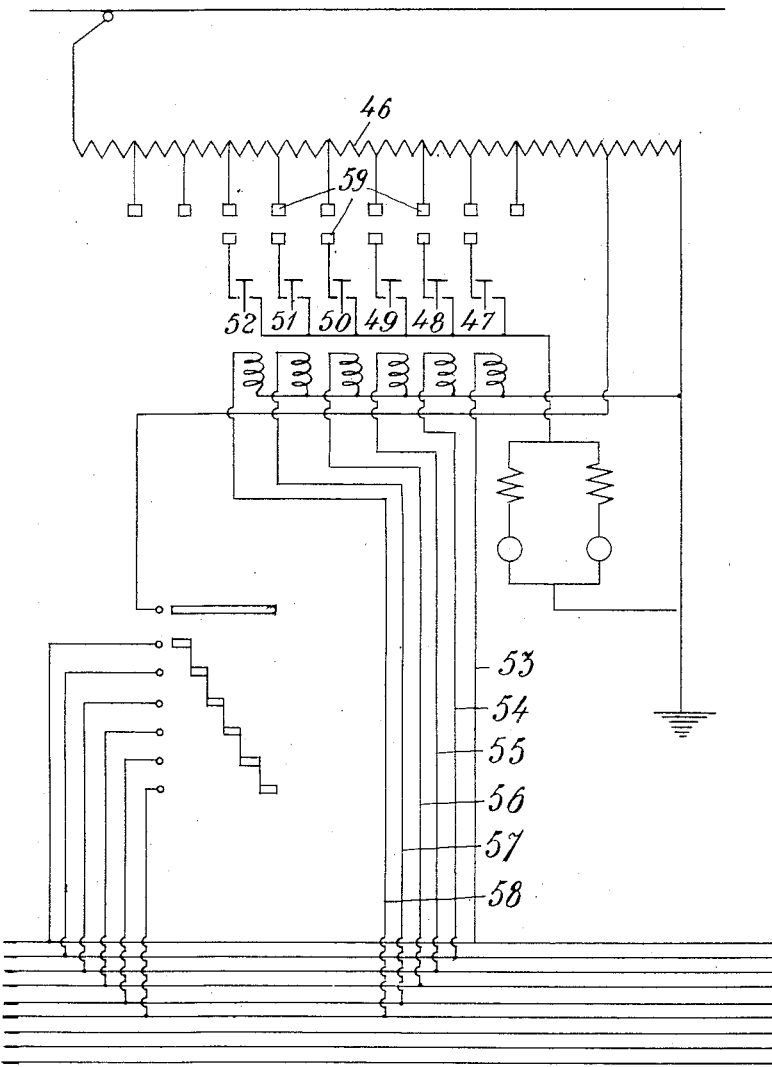
Figs. 2 and 3 show likewise diagrammatically other forms of the invention.

Fig. 2 shows a similar electric locomotive having controlling-devices according to the multiple-unit principle. Also in this form the auto-transformer 46 has nine spaced leads while, however, only six electromagnetic circuit-breakers 47, 48, 49, 50, 51, and 52 are provided, one for each controlling-wire 53, 54, 55, 56, 57, and 58. In order to render it possible to effect in the said device an adjustment for different controls of speed, I arrange between the said circuit-breakers 47—52 and the spaced leads special switches, a contact-apparatus 59, as is shown, or the like, whereby the said circuit-breakers may be connected to that group of spaced leads that gives the desired control of speed.

Figure 3:
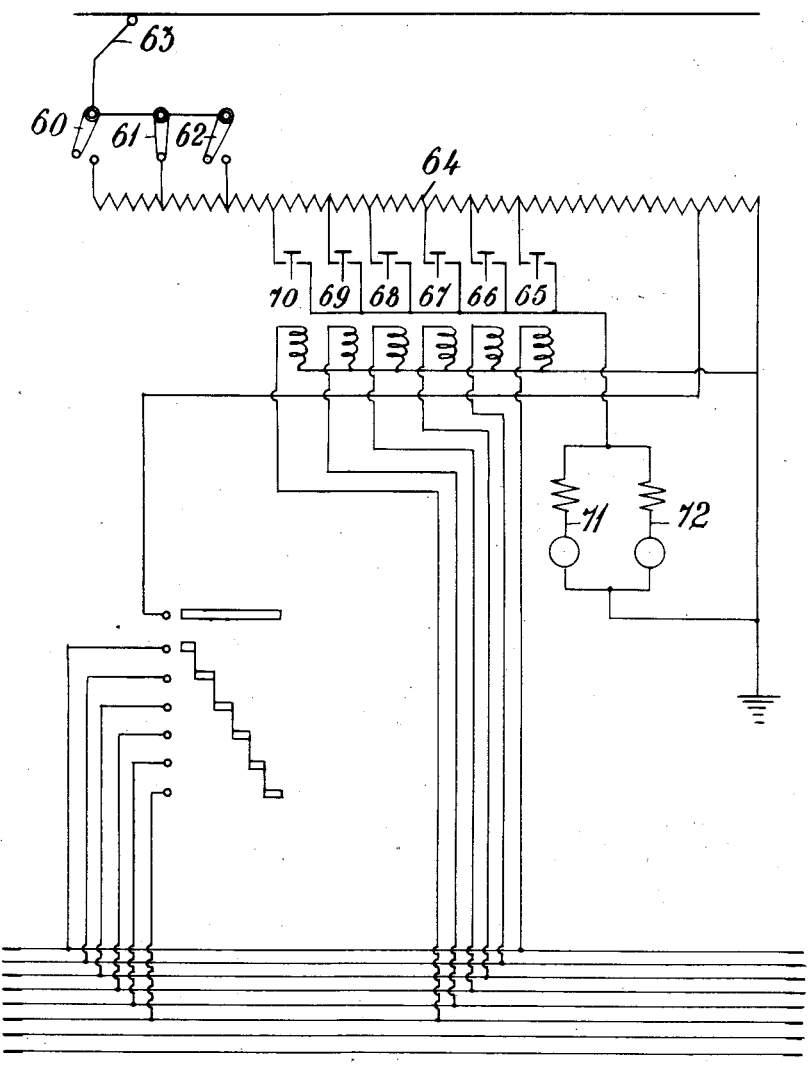

In the form shown in Fig. 3 switches 60, 61, and 62 are provided between the current collector 63 and spaced leads of the transformer 64. By closing the one or the other of said switches the voltage may be varied, which is supplied through the circuit-breakers 65, 66, 67, 68, 69, and 70 to the motors 71 and 72. In other respects the device is chiefly the same as that shown in Fig. 1. The speed of the locomotive will be greatest if the switch 62 be closed, and smallest if the switch 60 be closed. One may also obtain such a control of speed if the earth-wire be connected to different points of the transformer.

Though I have shown the application of my invention to an alternating current system where volume and voltage of current are controlled by an auto-transformer, it is obvious that the invention may be applied to other electric railway-systems for continuous or alternating current, in which the multiple-unit-controlling-system may be used.

Having now described my invention what I claim is:

1. The combination of a multiple-unit-controlling-system for electric railway-trains, and means whereby the respective voltages supplied to the motors of each unit may be independently regulated.

2. The combination with a multiple-unit-controlling-system for electric railway-trains, of transformers supplying the motor units, means for controlling the connections of the motor units to the said transformers, and means for changing independently the connections of said controlling means, substantially as and for the purpose set forth.

3. The combination with a multiple-unit-controlling-system for electric railway-trains, of transformers supplying the motor-units, said transformers having a greater number of spaced leads than the number of speed stages of the motors, and means for changing independently the groups of spaced leads used for supplying the motors, substantially as and for the purpose set forth.

4. The combination with a multiple-unit-controlling-system for electric railway-trains, of transformers supplying the motor-units, a number of switches for regulating the voltages supplied to the motor-units from the said transformers, a number of circuits controlling the said switches, and means for changing the connections between the said switches and the said controlling circuits, substantially as and for the purpose set forth.

In testimony whereof I have hereunto set my hand in presence of two subscribing witnesses.

RAGNAR WIKANDER.

Witnesses:
EVALD DELMAR,
JOHN DELMAR.